(12) United States Patent
Trombetta et al.

(10) Patent No.: US 10,765,952 B2
(45) Date of Patent: Sep. 8, 2020

(54) SYSTEM-LEVEL MULTIPLAYER MATCHMAKING

(71) Applicant: SONY INTERACTIVE ENTERTAINMENT LLC, San Mateo, CA (US)

(72) Inventors: Steven Trombetta, San Mateo, CA (US); Toshimasa Aoki, San Mateo, CA (US); Jonathan Webb, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/137,953

(22) Filed: Sep. 21, 2018

(65) Prior Publication Data
US 2020/0094148 A1 Mar. 26, 2020

(51) Int. Cl.
*A63F 13/795* (2014.01)
*A63F 13/798* (2014.01)
*A63F 13/79* (2014.01)
*A63F 13/45* (2014.01)

(52) U.S. Cl.
CPC ............ *A63F 13/795* (2014.09); *A63F 13/79* (2014.09); *A63F 13/798* (2014.09); *A63F 13/45* (2014.09); *A63F 2300/556* (2013.01); *A63F 2300/558* (2013.01); *A63F 2300/5566* (2013.01)

(58) Field of Classification Search
CPC ...... A63F 13/795; A63F 13/79; A63F 13/798; A63F 13/45; A63F 2300/5566; A63F 2300/558; A63F 2300/556
See application file for complete search history.

(56) References Cited

U.S. PATENT DOCUMENTS

| 5,630,757 A | 5/1997 | Gagin et al. |
| 5,634,129 A | 5/1997 | Dickinson |
| 5,682,139 A | 10/1997 | Pradeep |
| 5,704,032 A | 11/1997 | Badovinatz et al. |

(Continued)

FOREIGN PATENT DOCUMENTS

| CN | 104069637 A | 10/2014 |
| EP | 1125617 | 8/2001 |

(Continued)

OTHER PUBLICATIONS

U.S. Appl. No. 16/146,645 Office Action dated Sep. 20, 2019.

(Continued)

*Primary Examiner* — William H McCulloch, Jr.
(74) *Attorney, Agent, or Firm* — Polsinelli LLP

(57) ABSTRACT

A system and method for providing system-level multiuser matchmaking is provided. A user selection specifying a multiuser activity associated with an interactive content title is received. An activity template associated with the selected activity is retrieved and the retrieved activity template includes activity requirements required to launch the selected activity. A new multiuser session having session requirements is established, and the session requirements are based on at least the activity requirements. The user device and at least one peer device identified based on the session requirements is added to the new multiuser session. The selected activity is launched in the new multiuser session.

24 Claims, 4 Drawing Sheets

(56) References Cited

U.S. PATENT DOCUMENTS

| | | |
|---|---|---|
| 5,823,879 A | 10/1998 | Goldberg |
| 5,826,085 A | 10/1998 | Bennet |
| 5,838,909 A | 11/1998 | Roy et al. |
| 5,841,980 A | 11/1998 | Waters et al. |
| 5,862,339 A | 1/1999 | Bonnaure et al. |
| 5,893,106 A | 4/1999 | Brobst et al. |
| 5,941,947 A | 8/1999 | Brown |
| 5,956,485 A | 9/1999 | Perlman |
| 5,984,787 A | 11/1999 | Redpath |
| 5,987,376 A | 11/1999 | Olson et al. |
| 6,041,312 A | 3/2000 | Bickerton et al. |
| 6,050,898 A | 4/2000 | Vange |
| 6,098,091 A | 8/2000 | Kisor |
| 6,106,569 A | 8/2000 | Bohrer |
| 6,108,569 A | 8/2000 | Shen |
| 6,142,472 A | 11/2000 | Kliebisch |
| 6,151,632 A | 11/2000 | Chaddha et al. |
| 6,152,824 A | 11/2000 | Rothschild et al. |
| 6,154,782 A | 11/2000 | Kawaguchi et al. |
| 6,203,433 B1 | 3/2001 | Kume |
| 6,219,045 B1 | 4/2001 | Leahy et al. |
| 6,247,017 B1 | 6/2001 | Martin |
| 6,311,209 B1 | 10/2001 | Olson et al. |
| 6,345,297 B1 | 2/2002 | Grimm |
| 6,352,479 B1 | 3/2002 | Sparks |
| 6,363,416 B1 | 3/2002 | Naeimi |
| 6,446,113 B1 | 9/2002 | Ozzie et al. |
| 6,470,022 B1 | 10/2002 | Rochberger |
| 6,487,583 B1 | 11/2002 | Harvey |
| 6,487,678 B1 | 11/2002 | Briskey et al. |
| 6,519,629 B2 | 2/2003 | Harvey |
| 6,530,840 B1 | 3/2003 | Cuomo |
| 6,539,494 B1 | 3/2003 | Abramson et al. |
| 6,549,946 B1 | 4/2003 | Fisher |
| 6,560,636 B2 | 5/2003 | Cohen et al. |
| 6,561,811 B2 | 5/2003 | Rapoza et al. |
| 6,577,628 B1 | 6/2003 | Hejza |
| 6,587,874 B1 | 7/2003 | Golla |
| 6,607,444 B2 | 8/2003 | Takahashi et al. |
| 6,631,412 B1 | 10/2003 | Glasser et al. |
| 6,654,831 B1 | 11/2003 | Otterness et al. |
| 6,676,521 B1 | 1/2004 | La Mura et al. |
| 6,704,885 B1 | 3/2004 | Salas-Meza et al. |
| 6,748,420 B1 | 6/2004 | Quatrano et al. |
| 6,755,743 B1 | 6/2004 | Yamashita et al. |
| 6,761,636 B2 | 7/2004 | Chung et al. |
| 6,763,371 B1 | 7/2004 | Jandel |
| 6,769,990 B2 | 8/2004 | Cohen |
| 6,799,255 B1 | 9/2004 | Blumenau |
| 6,839,435 B1 | 1/2005 | Lijima et al. |
| 6,844,893 B1 | 1/2005 | Miller et al. |
| 6,931,446 B1 | 8/2005 | Cox et al. |
| 7,003,550 B1 | 2/2006 | Cleasby et al. |
| 7,016,942 B1 | 3/2006 | Odom |
| 7,018,295 B2 | 3/2006 | Sakaguchi et al. |
| 7,025,675 B2 | 4/2006 | Fogel |
| 7,035,919 B1 | 4/2006 | Lee et al. |
| 7,056,217 B1 | 6/2006 | Pelkey et al. |
| 7,073,187 B1 | 7/2006 | Hendricks et al. |
| 7,089,301 B1 | 8/2006 | Labio et al. |
| 7,107,312 B2 | 9/2006 | Hackbarth et al. |
| 7,155,515 B1 | 12/2006 | Brown et al. |
| 7,165,107 B2 | 1/2007 | Pouyoul et al. |
| 7,177,950 B2 | 2/2007 | Narayan et al. |
| 7,188,145 B2 | 3/2007 | Lowery et al. |
| 7,203,755 B2 | 4/2007 | Zhu et al. |
| 7,290,264 B1 | 10/2007 | Powers et al. |
| 7,366,185 B2 | 4/2008 | Bush |
| 7,454,458 B2 | 11/2008 | Islam et al. |
| 7,523,163 B2 | 4/2009 | Zhu et al. |
| 7,539,216 B2 | 5/2009 | Johns et al. |
| 7,587,465 B1 | 9/2009 | Muchow |
| 7,613,800 B2 | 11/2009 | Dhupelia |
| 7,614,955 B2 * | 11/2009 | Farnham ............... A63F 13/12 463/42 |
| 7,640,298 B2 | 12/2009 | Berg |
| 7,680,908 B2 | 3/2010 | Gates, III et al. |
| 7,711,847 B2 | 5/2010 | Dhupelia |
| 7,720,908 B1 | 5/2010 | Newson et al. |
| 7,730,206 B2 | 6/2010 | Newson et al. |
| 7,792,902 B2 | 9/2010 | Chatani |
| 7,822,809 B2 | 10/2010 | Dhupelia |
| 7,831,666 B2 | 11/2010 | Chatani et al. |
| 7,846,024 B2 * | 12/2010 | Graepel ............... G07F 17/3276 463/42 |
| 7,877,509 B2 | 1/2011 | Dhupelia |
| 7,899,017 B2 | 3/2011 | Yu et al. |
| 7,908,393 B2 | 3/2011 | Marr et al. |
| 7,930,345 B2 | 4/2011 | Dhupelia |
| 7,962,549 B2 | 6/2011 | Dhupelia |
| 8,032,619 B2 | 10/2011 | Kato et al. |
| 8,050,272 B2 | 11/2011 | Chaturvedi et al. |
| 8,051,180 B2 | 11/2011 | Mazzaferri et al. |
| 8,131,802 B2 | 3/2012 | Jacob |
| 8,214,489 B2 | 7/2012 | Ballette et al. |
| 8,335,813 B2 | 12/2012 | Sun et al. |
| 8,402,124 B1 | 3/2013 | Barillaud et al. |
| 8,425,330 B1 * | 4/2013 | Kislyi ............... A63F 13/12 463/32 |
| 8,554,842 B2 | 10/2013 | Maehiro |
| 8,560,707 B2 | 10/2013 | Jacob |
| 8,719,375 B2 | 5/2014 | Hildreth et al. |
| 8,725,874 B2 | 5/2014 | Keohane et al. |
| 8,727,892 B1 | 5/2014 | Chun |
| 8,856,233 B2 | 10/2014 | Lacapra et al. |
| 8,965,978 B2 | 2/2015 | Chandranmenon et al. |
| 8,972,548 B2 | 3/2015 | Jacob |
| 8,990,305 B2 | 3/2015 | Barkley et al. |
| 9,032,248 B1 | 5/2015 | Petty et al. |
| 9,120,020 B2 * | 9/2015 | Michel ............... A63F 13/12 |
| 9,369,540 B2 | 6/2016 | Lowery et al. |
| 9,516,068 B2 | 12/2016 | Jacob |
| 9,526,993 B2 * | 12/2016 | Rom ............... A63F 13/795 |
| 9,610,504 B2 * | 4/2017 | Kislyi ............... A63F 13/795 |
| 9,656,176 B2 * | 5/2017 | Riego ............... A63F 13/12 |
| 9,729,621 B2 | 8/2017 | Jacob |
| 9,762,631 B2 | 9/2017 | Chatani |
| 9,764,240 B2 * | 9/2017 | Khan ............... G06Q 10/101 |
| 9,931,571 B2 | 4/2018 | Cho ............... A63F 13/12 |
| 10,063,631 B2 | 8/2018 | Jacob et al. |
| 10,130,872 B2 * | 11/2018 | Buhr ............... A63F 13/61 |
| 10,130,889 B2 * | 11/2018 | Riego ............... A63F 13/12 |
| 10,343,069 B2 * | 7/2019 | Noss ............... A63F 13/493 |
| 10,449,458 B2 * | 10/2019 | Torres ............... A63F 13/798 |
| 2001/0009868 A1 | 7/2001 | Sakaguchi et al. |
| 2001/0024974 A1 | 9/2001 | Cohen |
| 2001/0037466 A1 | 11/2001 | Fukutake et al. |
| 2001/0044339 A1 | 11/2001 | Cordero et al. |
| 2002/0023117 A1 | 2/2002 | Bernardin et al. |
| 2002/0035604 A1 | 3/2002 | Cohen et al. |
| 2002/0042830 A1 | 4/2002 | Bose et al. |
| 2002/0049086 A1 | 4/2002 | Otsu |
| 2002/0062348 A1 | 5/2002 | Maehiro |
| 2002/0075844 A1 | 6/2002 | Hagen |
| 2002/0075940 A1 | 6/2002 | Haartsen |
| 2002/0082077 A1 | 6/2002 | Johnson |
| 2002/0082086 A1 | 6/2002 | Scallie |
| 2002/0086732 A1 | 7/2002 | Kirmse et al. |
| 2002/0107934 A1 | 8/2002 | Lowery et al. |
| 2002/0107935 A1 | 8/2002 | Lowery et al. |
| 2002/0115488 A1 | 8/2002 | Berry |
| 2002/0133707 A1 | 9/2002 | Newcombe |
| 2002/0137565 A1 | 9/2002 | Blanco |
| 2002/0142842 A1 | 10/2002 | Easley et al. |
| 2002/0156917 A1 | 10/2002 | Nye |
| 2002/0169889 A1 | 11/2002 | C |
| 2002/0178260 A1 | 11/2002 | Chang |
| 2002/0184070 A1 | 12/2002 | Chen et al. |
| 2003/0018719 A1 | 1/2003 | Ruths |
| 2003/0073494 A1 | 4/2003 | Kalpakian et al. |
| 2003/0093669 A1 | 5/2003 | Morals et al. |
| 2003/0126245 A1 | 7/2003 | Feltin et al. |
| 2003/0167343 A1 | 9/2003 | Furuno |
| 2003/0190960 A1 | 10/2003 | Jokipii |

(56) References Cited

U.S. PATENT DOCUMENTS

| | | |
|---|---|---|
| 2003/0204566 A1 | 10/2003 | Dhupelia |
| 2003/0204593 A1 | 10/2003 | Brown et al. |
| 2003/0214943 A1 | 11/2003 | Engstrom et al. |
| 2003/0216181 A1 | 11/2003 | Daniell et al. |
| 2003/0217135 A1 | 11/2003 | Chatani |
| 2003/0217158 A1 | 11/2003 | van Datta |
| 2003/0233537 A1 | 12/2003 | Wohlgemuth et al. |
| 2004/0001476 A1 | 1/2004 | Islam et al. |
| 2004/0002384 A1 | 1/2004 | Multerer et al. |
| 2004/0024879 A1 | 2/2004 | Dingman |
| 2004/0030787 A1 | 2/2004 | Jandel |
| 2004/0031052 A1 | 2/2004 | Wannamaker et al. |
| 2004/0053690 A1 | 3/2004 | Fogel |
| 2004/0059711 A1 | 3/2004 | Jandel |
| 2004/0117443 A1 | 6/2004 | Barsness |
| 2004/0139228 A1 | 7/2004 | Takeda |
| 2005/0038836 A1 | 2/2005 | Wang |
| 2005/0068894 A1 | 3/2005 | Yu et al. |
| 2005/0105526 A1 | 5/2005 | Stiemerling |
| 2005/0144521 A1 | 6/2005 | Werner |
| 2005/0181878 A1 | 8/2005 | Danieli et al. |
| 2005/0245317 A1 | 11/2005 | Arthur et al. |
| 2005/0251577 A1 | 11/2005 | Guo |
| 2005/0259637 A1 | 11/2005 | Chu |
| 2005/0262411 A1 | 11/2005 | Vertes |
| 2006/0015560 A1 | 1/2006 | MacAuley et al. |
| 2006/0047836 A1 | 3/2006 | Rao et al. |
| 2006/0075127 A1 | 4/2006 | Juncker |
| 2006/0085792 A1 | 4/2006 | Traut |
| 2006/0092942 A1 | 5/2006 | Newson et al. |
| 2006/0100020 A1 | 5/2006 | Kasai |
| 2006/0121991 A1 | 6/2006 | Borinik et al. |
| 2006/0142085 A1 | 6/2006 | Kim |
| 2006/0168107 A1 | 6/2006 | Balan et al. |
| 2006/0164974 A1 | 7/2006 | Ramalho et al. |
| 2006/0190540 A1 | 8/2006 | Chatani |
| 2006/0200551 A1 | 9/2006 | Bali et al. |
| 2006/0218274 A1 | 9/2006 | Labio et al. |
| 2006/0218275 A1 | 9/2006 | Labio et al. |
| 2006/0247011 A1 | 11/2006 | Gagner |
| 2006/0248144 A1 | 11/2006 | Zhu et al. |
| 2006/0253595 A1 | 11/2006 | van Datta |
| 2006/0258463 A1 | 11/2006 | Cugno et al. |
| 2006/0288103 A1 | 12/2006 | Gobara |
| 2007/0058792 A1 | 3/2007 | Chaudhari |
| 2007/0061460 A1 | 3/2007 | Khan |
| 2007/0076729 A1 | 4/2007 | Takeda |
| 2007/0094325 A1 | 4/2007 | Ih et al. |
| 2007/0099702 A1 | 5/2007 | Tupper |
| 2007/0117635 A1 | 5/2007 | Spanton et al. |
| 2007/0165629 A1 | 7/2007 | Chaturvedi |
| 2007/0173325 A1* | 7/2007 | Shaw ................ A63F 13/12 463/42 |
| 2007/0174399 A1 | 7/2007 | Ogle et al. |
| 2007/0191109 A1 | 8/2007 | Crowder |
| 2007/0207860 A1 | 9/2007 | Yamauchi et al. |
| 2007/0208748 A1 | 9/2007 | Li |
| 2007/0217436 A1 | 9/2007 | Markley |
| 2007/0218997 A1* | 9/2007 | Cho ................ A63F 13/12 463/42 |
| 2007/0233865 A1 | 10/2007 | Garbow et al. |
| 2007/0288598 A1 | 12/2007 | Edeker et al. |
| 2007/0291706 A1 | 12/2007 | Miller et al. |
| 2008/0049755 A1 | 2/2008 | Gannon et al. |
| 2008/0189365 A1 | 8/2008 | Narayanaswami et al. |
| 2008/0242420 A1* | 10/2008 | Graepel ................ A63F 13/12 463/42 |
| 2008/0243953 A1 | 10/2008 | Wu et al. |
| 2008/0280686 A1 | 11/2008 | Dhupelia et al. |
| 2008/0291839 A1 | 11/2008 | Hooper et al. |
| 2009/0006545 A1 | 1/2009 | Dhupelia |
| 2009/0006604 A1 | 1/2009 | Dhupelia |
| 2009/0042646 A1* | 2/2009 | Sarkar ................ H04L 67/145 463/29 |
| 2009/0077245 A1 | 3/2009 | Smelyansky |
| 2009/0089363 A1 | 4/2009 | Keohane et al. |
| 2009/0094370 A1 | 4/2009 | Jacob |
| 2009/0104956 A1* | 4/2009 | Kay ................ A63F 13/10 463/7 |
| 2009/0111576 A1 | 4/2009 | Ostergren et al. |
| 2009/0113060 A1 | 4/2009 | Jacob |
| 2009/0138610 A1 | 5/2009 | Gobara |
| 2009/0157882 A1 | 6/2009 | Kashyap |
| 2009/0240821 A1 | 9/2009 | Juncker |
| 2009/0287828 A1 | 11/2009 | Wei et al. |
| 2009/0325711 A1 | 12/2009 | Bronstein et al. |
| 2009/0325712 A1* | 12/2009 | Rance ................ A63F 13/12 463/42 |
| 2010/0153496 A1 | 6/2010 | Heinla |
| 2010/0279767 A1 | 11/2010 | Dhupelia |
| 2010/0285872 A1 | 11/2010 | Dhupelia |
| 2010/0287239 A1 | 11/2010 | Chatani |
| 2011/0177863 A1 | 7/2011 | Davidsion et al. |
| 2012/0142429 A1* | 6/2012 | Muller ................ A63F 13/45 463/42 |
| 2012/0166651 A1 | 6/2012 | Jacob |
| 2012/0166994 A1 | 6/2012 | Aonuma et al. |
| 2012/0322560 A1 | 12/2012 | Joo |
| 2013/0007013 A1* | 1/2013 | Geisner ................ A63F 13/12 707/748 |
| 2013/0260896 A1 | 10/2013 | Miura et al. |
| 2013/0304931 A1 | 11/2013 | Jacob |
| 2013/0310181 A1* | 11/2013 | Kislyi ................ A63F 13/795 463/42 |
| 2014/0256449 A1 | 9/2014 | Chatani et al. |
| 2014/0274402 A1* | 9/2014 | Michel ................ A63F 13/12 463/42 |
| 2015/0038233 A1* | 2/2015 | Rom ................ A63F 13/42 463/42 |
| 2015/0180958 A1 | 6/2015 | Jacob |
| 2016/0001183 A1 | 1/2016 | Harvey et al. |
| 2016/0082355 A1 | 3/2016 | Kobayashi et al. |
| 2016/0346701 A1 | 12/2016 | George |
| 2017/0182423 A1* | 6/2017 | Leppinen ................ A63F 13/35 |
| 2017/0291109 A1* | 10/2017 | Jensen ................ G07F 17/32 |
| 2018/0013802 A1 | 1/2018 | Chatani |
| 2018/0013820 A1 | 1/2018 | Jacob |
| 2018/0102029 A1 | 4/2018 | Leslie et al. |
| 2018/0193741 A1 | 7/2018 | Kiwada et al. |
| 2018/0250591 A1 | 9/2018 | Prado Rojas et al. |
| 2018/0290060 A1* | 10/2018 | Noss ................ A63F 13/67 |
| 2019/0262717 A1* | 8/2019 | Thielbar ................ A63F 13/795 |
| 2019/0266845 A1* | 8/2019 | Trombetta ................ A63F 13/86 |
| 2019/0282907 A1* | 9/2019 | Jensen ................ G07F 17/32 |
| 2020/0086217 A1 | 3/2020 | Trombetta et al. |
| 2020/0097147 A1 | 3/2020 | Trombetta et al. |
| 2020/0101377 A1 | 4/2020 | Trombetta et al. |

FOREIGN PATENT DOCUMENTS

| | | |
|---|---|---|
| EP | 1499987 | 1/2005 |
| EP | 2360874 | 8/2011 |
| EP | 2360875 | 8/2011 |
| GB | 2325543 A | 11/1998 |
| IN | 269863 | 12/2015 |
| JP | 05-022346 | 1/1993 |
| JP | 63-232725 | 9/1998 |
| JP | 11-234326 | 8/1999 |
| JP | 2000-124939 | 4/2000 |
| JP | 2000-157724 | 6/2000 |
| JP | 2001-187273 | 7/2001 |
| JP | 2001-314657 | 11/2001 |
| JP | 2002-011251 | 1/2002 |
| JP | 2003-099337 | 4/2003 |
| TW | 201347493 | 11/2013 |
| TW | I491229 | 7/2015 |
| WO | WO 2000/05854 | 2/2000 |
| WO | WO 2000/10099 | 2/2000 |
| WO | WO 2000/68864 | 11/2000 |
| WO | WO 2001/63423 | 8/2001 |
| WO | WO 2001/82678 | 11/2001 |
| WO | WO 2002/35769 | 5/2002 |
| WO | WO 2003/091894 | 11/2003 |

(56) References Cited

FOREIGN PATENT DOCUMENTS

| WO | WO 2003/100643 | 12/2003 |
|---|---|---|
| WO | WO 2004/063843 | 7/2004 |
| WO | WO 2005/088466 | 9/2005 |
| WO | WO 2006/023508 | 3/2006 |
| WO | WO 2009/045475 | 4/2009 |
| WO | WO 2020/060877 | 3/2020 |
| WO | WO 2020/060879 | 3/2020 |
| WO | WO 2020/060880 | 3/2020 |
| WO | WO 2020/068462 | 4/2020 |

OTHER PUBLICATIONS

PCT/US19/51140, Dynamic Interfaces for Launching Direct Gameplay, Sep. 13, 2019.
PCT/US19/51146, Integrated Interfaces for Dynamic User Experiences, Sep. 13, 2019.
PCT/US19/51150, System-Level Multiplayer Matchmaking, Sep. 13, 2019.
PCT/US19/51157, Establishing and Managing Multiplayer Sessions, Sep. 13, 2019.
"Brief for Appellee," in re Masayuki Chatani et al., U.S. Court of Appeals for the Federal Circuit (2007-1150) (May 21, 2007).
"Brief of Appellants," in re Masayuki Chatani et al., U.S. Court of Appeals for the Federal Circuit (2007-1150) (Mar. 23, 2007).
"In Re Masayuki Chatani and Glen Van Datta," United States Court of Appeals for the Federal Circuit, 2007-1150 (U.S. Appl. No. 11/211,128), Nov. 19, 2007.
"Petition for Panel Rehearing," In Re Masayuki Chatani and Glen Van Datta, Appeal From the United States Patent and Trademark Office, Board of Patent Appeals and Interferences, In the United States Court of Appeals for the Federal Circuit, 2007-1150 (U.S. Appl. No. 10/211,128), Jan. 3, 2008.
"Reply Brief of Appellants," In re Masayuki Chatani et al., U.S. Court of Appeals for the Federal Circuit (2007-1150) (Jun. 4, 2007).
"Technical Issues of establishing any-to-any 2-way real-time communications over the internet," Apr. 24, 2005, URL http://web.archive.org/web/20050424081036/.
Aronson, Jesse. "Using Groupings for Networked Gaming," Gamasutra.com, Jun. 21, 2000.
Audet, F. Nat Behavioral Requirements for Unicast UDP, BEHAVE Internet—Draft, Jul. 15, 2005.
Boulic, Ronan etl al. "Integration of Motion Control Techniques for Virtual Human and Avatar Real-Time Animation," Swiss Fedl Inst. of Tech., Lausanne, Switzerland, Sep. 1997.
Chiueh, Tzi-cker, "Distributed Systems Support for Networked Games," Computer Science Department, State University of New York at Stony Brook, Stony Brook, NY, May 1997.
Cisco Systems Inc., "Network Flow Management: Resource Reservation for Multimedia Flows," Mar. 19, 1999.
Diot et al., "A Distributed Architecture for Multiplayer Interactive Applications on the Internet", Aug. 1999, Network, IEEE, vol. 13, Issue 4, Jul.-Aug. 1999, pp. 6-15.
Fiesta and Borland, "Netscape alumni to launch P2P company", Aug. 2, 2001, (avaiable at http://news.cnet.com/news/0-1005-202-6766377.html).
Hagsand O: Interactive Multiuser Ves in the DIVE System: IEEE Multimedia, IEEE Service Center, New York, NY, US vol. 3, No. 1, 21 Mar. 21, 1996, pp. 30-39, XP000582951 ISSN: 1070-986X.
Hanada, S. "The Design of Network Game and DirectPlay," Inside Windows, Softbank K.K., vol. 4, pp. 42-57, Apr. 1, 1998.
Rosenberg, J. Interactive Connectivity Establishment (ICE): A Methodology for Network Address Translator (NAT) Traversal for Multimedia Session Establishment Protocols, Mmusic Internet-Draft, Jul. 19, 2004.
Rosenberg, J. Interactive Connectivity Establishment (ICE): A Methodology for Network Address Translator (NAT) Traversal for Offer/Answer Protocols, Mmusic Internet-Draft, Jul. 17, 2005.
Rosenberg, J. Interactive Connectivity Establishment (ICE): A Methodology for Network Address Translator (NAT) Traversal for Multimedia Session Establishment Protocols, Mmusic Internet-Draft, Oct. 25, 2004.
Rosenberg, J. Interactive Connectivity Establishment (ICE): A Methodology for Network Address Translator (NAT) Traversal for Off/Answer Protocols, Mmusic Internet-Draft, Jan. 16, 2007.
Rosenberg, J. "Simple Traversal of UDP Through Network Address Translators (NAT)," BEHAVE Internet-Draft, Jul. 17, 2005.
Rosenberg, J. STUN—Simple Traversal of User Datagram Protocols (UDP) Throught Network Address Translators (NATs), Network Working Group, Mar. 2003.
Rosenberg, J. Traversal using Relay NAT (TURN), MIDCOM Internet-Draft, Oct. 20, 2003.
Takeda, Y. Symmetric NAT Traversal Using STUN, Internet Engineering Task Force, Jun. 2003.
PCT/US03/08682 International Search Report dated Oct. 14, 2003.
PCT/US03/12668 International Search Report dated Jul. 17, 2003.
PCT/US08/11415 Search Report and Written Opinion dated Dec. 5, 2008.
PCT Application No. PCT/US2019/051140 International Search Report and Written Opinion dated Nov. 15, 2019.
PCT Application No. PCT/US2019/051146 International Search Report and Written Opinion dated Nov. 18, 2019.
PCT Application No. PCT/US2019/051157 International Search Report and Written Opinion dated Oct. 16, 2019.
PCT Application No. PCT/US2019/051150 International Search Report and Written Opinion dated Nov. 4, 2019.
EP 037211413, European Search Report dated Jun. 30, 2005.
EP 08835745.4 Extended European Search Report dated Jul. 22, 2011.
EP 11004182.9 Extended European Search Report dated Jul. 14, 2011.
EP 11004181.1 Extended European Search Report dated Jul. 22, 2011.
U.S. Appl. No. 16/1137,953 Office Action dated Nov. 27, 2019.
U.S. Appl. No. 16/135,273 Office Action dated Jan. 17, 2020.
U.S. Appl. No. 16/138,306 Office Action dated Apr. 8, 2020.

* cited by examiner

SYSTEM-LEVEL MULTIPLAYER MATCHMAKING

BACKGROUND

1. Field of the Invention

The present technology pertains to providing multiplayer matchmaking. More specifically, the present technology may provide multiplayer matchmaking at a system-level.

2. Description of the Related Art

Multiuser gameplay is a popular and ever-growing segment of gameplay. Multiuser gameplay typically involves users finding a match to a suitable group of peers. Presently available matchmaking services may be performed in-game after a user has launched such game and may then be separately performed for each different game title that the user launches. Such matchmaking may use different methods of matchmaking for each game. Further, steps to perform multiuser matchmaking may be different in each game. Presently available matchmaking may also be performed based on limited information from a user and/or a peer.

Due to the popularity of multiuser games and playing games with a set group of peers (e.g., friends), significant delays and repeated and/or different steps in each game can have significant impact on user experience. Such matchmaking may, for example, detract from the user experience by causing delays (e.g., when matchmaking is required to occur each time the user changes games or sessions) and/or the matchmaking is poor due to wide variances between a peer's experience and the user's experience. Further, in some cases, such matchmaking must be repeated for groups of player that regularly play different games together, resulting in further delays in gameplay.

There is, therefore, a need in the art for systems and methods for system-level multiuser matchmaking.

SUMMARY OF THE PRESENTLY CLAIMED INVENTION

Embodiments of the present invention include systems and methods for system-level multiuser matchmaking. Data regarding an interactive content title, an activity template, and a multiuser session may be stored in memory. The activity template may be associated with the interactive content title and may include activity requirements. A user selection of an activity may be received. A plurality of active multiuser sessions associated with the selected activity may be retrieved. A new multiuser session may be established. The new multiuser session may have session requirements that may be based on at least the activity requirements provided by the retrieved activity template. A user device and at least one peer device may be added to the new multiuser session. The at least one peer device may be associated with at least one peer identified based on the session requirements. The selected activity may be launched in the new multiuser session.

Various embodiments may include methods for system-level multiuser matchmaking. Such methods may include receiving a user selection from a user device of a user. The user selection may specify a multiuser activity associated with an interactive content title. Such methods may include retrieving information regarding a plurality of active multiuser sessions associated with the selected activity. Such methods may include retrieving an activity template associated with the selected activity. The retrieved activity template may provide activity requirements required to launch the selected activity. Such methods may include establishing a new multiuser session having session requirements that are based on at least the activity requirements provided by the retrieved activity template. Such methods may include adding the user device and at least one identified peer device to the new multiuser session. The at least one peer device may be associated with at least one peer identified based on the session requirements. Such methods may include launching the selected activity in the new multiuser session that has been established for the user device and the at least one identified peer device.

Additional embodiments may include systems for system-level multiuser matchmaking. Such systems may include memory that stores interactive content titles and one or more activity templates associated with each interactive content title. Such systems may include a network interface that establishes a session with a user device associated with the user over a communication network. Such systems may include a processor that executes instructions stored in memory. Execution of the instructions by the process may receive a user selection from the user device. The user selection may specify a multiuser activity associated with an interactive content title. Execution of the instructions by the processor may retrieve information regarding a plurality of active multiuser sessions associated with the selected activity. Execution of the instructions by the processor may retrieve an activity template stored in memory associated with the selected activity. The retrieved activity template may provide activity requirements required to launch the selected activity. Execution of the instructions by the processor may establish a new multiuser session having session requirements that are based on at least the activity requirements provided by the retrieved activity template. Execution of the instructions by the processor may add the user device and at least one identified peer device to the new multiuser session. The at least one peer device may be associated with at least one peer identified based on the session requirements. Execution of the instructions by the processor may launch the selected activity in the new multiuser session that has been established for the user device and the at least one identified peer device.

Further embodiments include non-transitory computer-readable storage media having embodied thereon a program executable by a processor to perform system-level multiuser matchmaking.

DETAILED DESCRIPTION

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the technology. However, it will be clear and apparent that the technology is not limited to the specific details set forth herein and may be practiced without these details. In some instances, structures and components are shown in block diagram form in order to avoid obscuring the concepts of the subject technology.

Embodiments of the present invention include systems and methods for system-level multiuser matchmaking. A user may select an activity that requires multiple users to participate in the activity. Such activity may be associated with an interactive content title. The user may be matched to an existing active multiuser session associated with the selected activity, or a new multiuser session may be generated if the user does not match to an existing multiuser session. Such multiuser sessions may have session requirements or qualifications that a user and/or peers must have in order to join a particular multiuser session.

Figure 1:
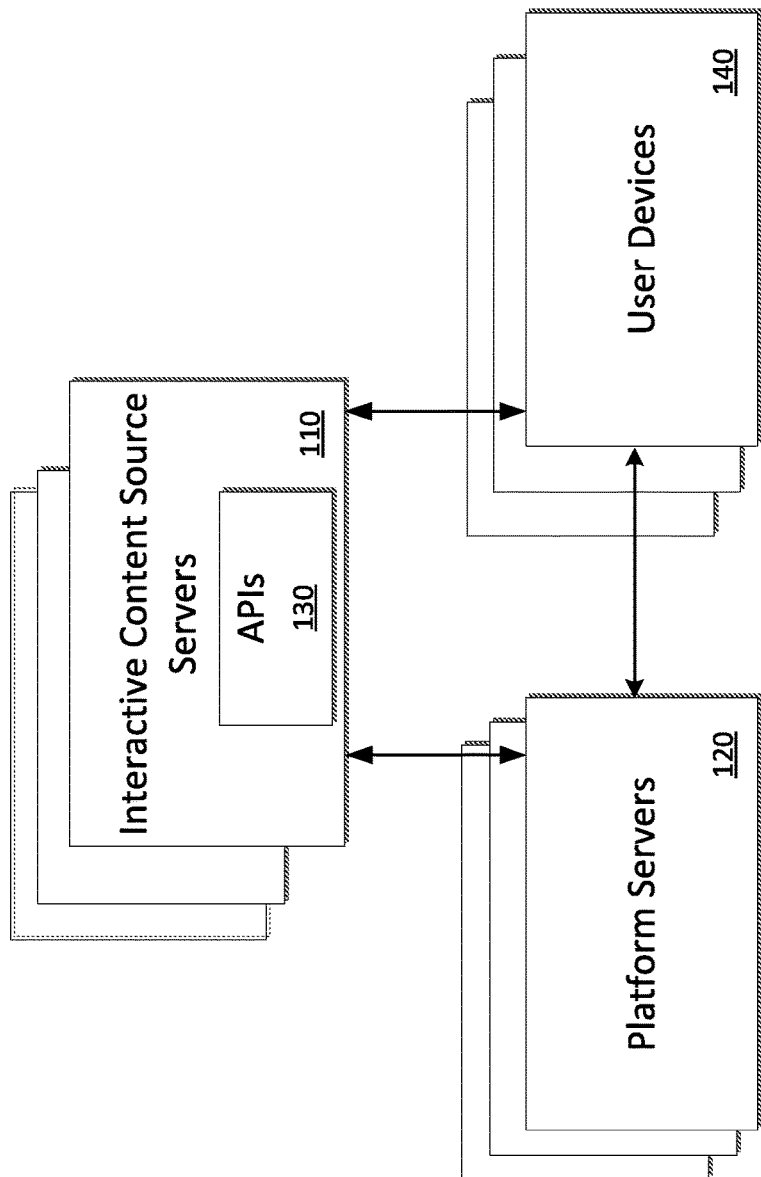
FIG. 1 illustrates a network environment in which a system for system-level multiuser matchmaking may be implemented.

FIG. 1 illustrates a network environment 100 in which a system for system-level multiuser matchmaking can occur. The network environment 100 may include one or more interactive content source servers 110 that provide interactive content (e.g., video games, interactive video, etc.), platform servers 120, and one or more user devices 140.

Interactive content source servers 110 may maintain and host interactive content titles available for play to a user device 140 over a communication network. Such interactive content servers 110 may be implemented in the cloud (e.g., one or more cloud servers). Each interactive content title may include one or more activities available within the content title. The one or more activities may be playable by a single user or by multiple users. Each interactive content title may include one or more templates corresponding to one or more activities available within the content title. Each template may provide a structured data set regarding the corresponding activities and that may be used as the basis for tracking and displaying information regarding the corresponding activities in real-time.

In one example, the interactive content title is a video game title, and the one or more templates may correspond to different modes of competitive gameplay available within that game title. In another example, the one or more templates may correspond to different chapters of an interactive storyline. Each template may be associated with a portion of the interactive content title where the corresponding activity starts within the interactive content title. For example, the template may include a waypoint within a portion of a game (e.g., at a specific game environment location at a specific point in time in the game storyline) where an activity starts. In another example, the template may virtually teleport a character of the user to the location within the game environment that is closest to the start of the associated activity. The template may also be associated with matchmaking so as to assign the user to a competitive match (e.g., by skill, experience level, or availability of other peers). Such template associated with the matchmaking may further provide activity requirements (e.g., number of players maximum and/or minimum, skill level and/or rank, character level and/or rank, user device requirements, etc.) required to launch the selected activity (e.g., competitive match). Each template may be updated, edited, or removed, or new templates may be created. The one or more templates may be stored at the interactive content source servers 110 or at platform server 120 and retrieved therefrom.

The platform servers 120 may be responsible for communicating with the different interactive content source servers 110 in order to match a user to one of a plurality of active multiuser sessions associated with a selected activity. Such platform servers 120 may be implemented on one or more cloud servers. The interactive content source servers 110 may communicate with multiple platform servers 120. The platform servers 120 may also carry out instructions, for example, for generating a multiuser session having session requirements. Such session requirements may be based off of the activity requirements (e.g., maximum and/or minimum number of players, skill level and/or rank, character level and/or rank, user device requirements, etc.) of the template associated with the selected activity. The multiuser session may be established by a platform server 120 associated with a user or with a peer. Such multiuser session can include two or more users and can provide communication between the users (e.g., voice chat, video chat, direct messaging, text chat, etc.) within the multiuser session. The platform servers 120 may further carry out instructions, for example, to automatically launch the selected activity within the multiuser session in accordance with the activity template.

The interactive content titles and their corresponding activities may be provided through an application programming interface (API) 130, which allows various types of interactive content sources server 110 to communicate with different platform servers 120 and different user devices 140. API 130 may be specific to the particular computer programming language, operating system, protocols, etc., of the interactive content source servers 110 providing the interactive content titles, the platform servers 120 providing the associated templates, and user devices 140 receiving the same. In a network environment 100 that includes multiple different types of interactive content source servers 110 (or platform servers 120 or user devices 140), there may likewise be a corresponding number of APIs 130.

The user device 140 may include a plurality of different types of computing devices. For example, the user device 140 may include any number of different gaming consoles, mobile devices, laptops, and desktops. Such user devices 140 may also be configured to access data from other storage media, such as, but not limited to memory cards or disk drives as may be appropriate in the case of downloaded services. Such devices 140 may include standard hardware computing components such as, but not limited to network and media interfaces, non-transitory computer-readable storage (memory), and processors for executing instructions that may be stored in memory. These user devices 140 may also run using a variety of different operating systems (e.g., iOS, Android), applications or computing languages (e.g., C++, JavaScript). An exemplary user device 140 is described in detail herein with respect to FIG. 4.

Figure 2:
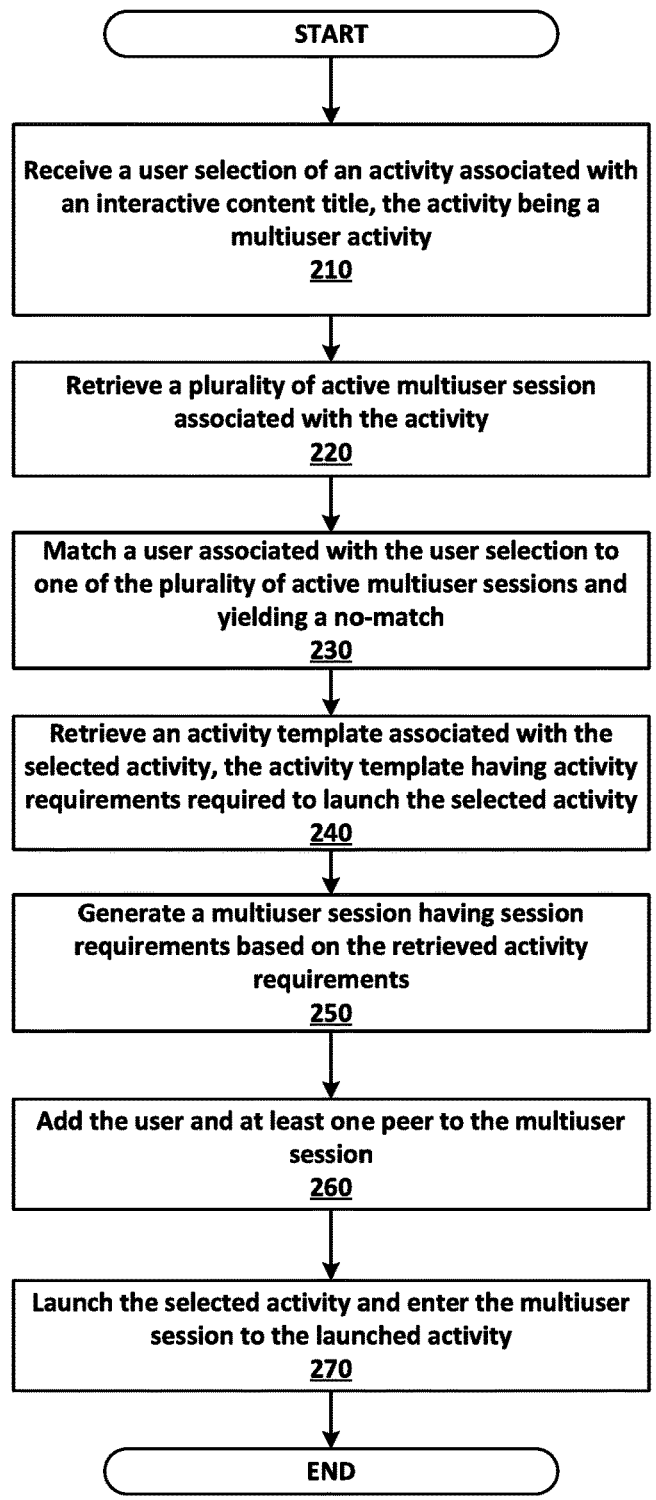
FIG. 2 is a flowchart illustrating an exemplary method for system-level multiuser matchmaking when a match with an existing multiuser session does not occur.

FIG. 2 is a flowchart illustrating an exemplary method 200 for system-level multiuser matchmaking when a match for a user to an existing multiuser session does not occur. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers (e.g., the steps identified in FIG. 2 are performed in the cloud). The steps identified in FIG. 2 (and the order thereof) are exemplary and may include various alternatives, equivalents, or derivations thereof including but not limited to the order of execution of the same.

In step 210, a user selection of an activity associated with an interactive content title is received by the platform server 120. Such activity may be an activity requiring multiple user participation (e.g., a dungeon, multi-user quest, competitive match, etc.). Such selection may occur while a user is participating in a different activity of the same or different interactive content title.

In step 220, data relating to a plurality of active multiuser sessions associated with the activity may be retrieved from the interactive content source servers 110 by the platform server 120. Such data may include data regarding each active multiuser session available for matchmaking. Such active multiuser sessions may be in various states of progression (e.g., may need one user or may need multiple users to participate in the specified activity, etc.). Such active multiuser sessions may also have session requirements restricting which users can join the active multiuser session. For example, a multiuser session may require that a character of the user has a minimum skill level.

In step 230, matching may occur between a user associated with the user selection and the plurality of active multiuser sessions by the platform server 120. Such matching may be based on the user and the data regarding each active multiuser session. During matching (which may occur in the background), the user may continue to participate in other activities of other interactive content titles. Such matching may yield a no-match when the user does not match any of the active multiuser sessions. No-match may occur, for example, when the user does not meet the session requirements of any active multiuser session. When no-match occurs, a new multiuser session may be established, as discussed below. Such matchmaking may occur in the background as the user device is participating in related or unrelated activities in the same or different game title. As such, the platform server 120 may further maintain information regarding active game sessions and status thereof in real-time or near real-time. Further, user devices already participating in multiuser sessions may not be allowed to initiate background matchmaking to avoid sessions being matched to missing players. In some embodiments, the user device may be placed in a waiting state until it has exited a current session.

In step 240, an activity template associated with the selected activity and stored at the interactive content source servers 110 may be retrieved by the platform server 120. Such activity template may include activity requirements required to launch the selected activity. Such activity requirements may regard hardware, software, user, and/or peer requirements in addition to maximum and/or minimum numbers of users required to begin the activity.

In step 250, a multiuser session having session requirements may be established by the platform server 120 or the interactive content source servers 110. Such session requirements may be based on the retrieved activity requirements. For example, the activity requirements—and subsequently the session requirements—may require four users each using a certain user device (e.g., Sony PlayStation®). Such session requirements may also be based on a user profile associated with the user. Such user profile may be stored in memory at the platform servers 120 or the user device 140. Such user profile may include user data (e.g., peer skills, character levels and/or skills, hours played, type of games played, etc.), data regarding an associated user device (e.g., hardware components and capabilities, software, router information, geolocation etc.), and/or user device peripherals (e.g., microphone, camera, mouse, controller, devices, etc.). For example, a session requirement may require that peer characters either match or exceed a user character's level. In another example, the session requirement may require that a user device be capable of performing host duties, which may be indicated by the user profile as to user device capabilities.

In step 260, the user and at least one peer user may be added to the multiuser session by the platform server 120. The peer may be added based on the peer (and/or peer device and peripherals) meeting the session requirements. Such match may include retrieving a peer profile associated with the peer. Such peer profile may be stored in memory at the platform servers 120 or the user devices 140. Such peer profile may include peer data (e.g., peer skills, character levels and/or skills, hours played, type of games played, etc.), data regarding an associated peer device (e.g., hardware components and capabilities, software, router information, geolocation etc.), and/or peer device peripherals (e.g., microphone, camera, mouse, controller, devices, etc.). Such peer profile may be used to rank multiple peers for a multiuser session and can provide backup peers if a selected peer removes themselves from the multiuser session. For example, seven peers may match to a multiuser session requiring three peers. Three peers may be selected to join the multiuser session, and the four remaining peers may be ranked to determine which remaining peer may replace a peer that may leave the multiuser session.

In step 270, the selected activity may be launched by the interactive content source servers 110 or the platform server 120 within the multiuser session. Such launched activity may be a competitive match that requires two or more participants, thereby requiring matchmaking between different users (who may be in different multiuser sessions) and the competitive match. Such competitive match may have competitive match requirements regarding which multiuser sessions can be joined so that its respective users can participate in the competitive match. In such competitive match, one or more multiuser sessions are matched to the competitive match based on the user and peers within each multiuser session and the competitive match requirements. For example, a first multiuser session and a second multiuser session may be identified for the competitive match based on the similarities between the users of the first multiuser session and the users of the second multiuser session. Such first multiuser session and second multiuser session could then be merged or otherwise connected, so that the respective users can participate in the same competitive match (e.g., to compete against each other or cooperate together against a common third party (e.g., a boss, another multiuser sessions, etc.)).

Figure 3:
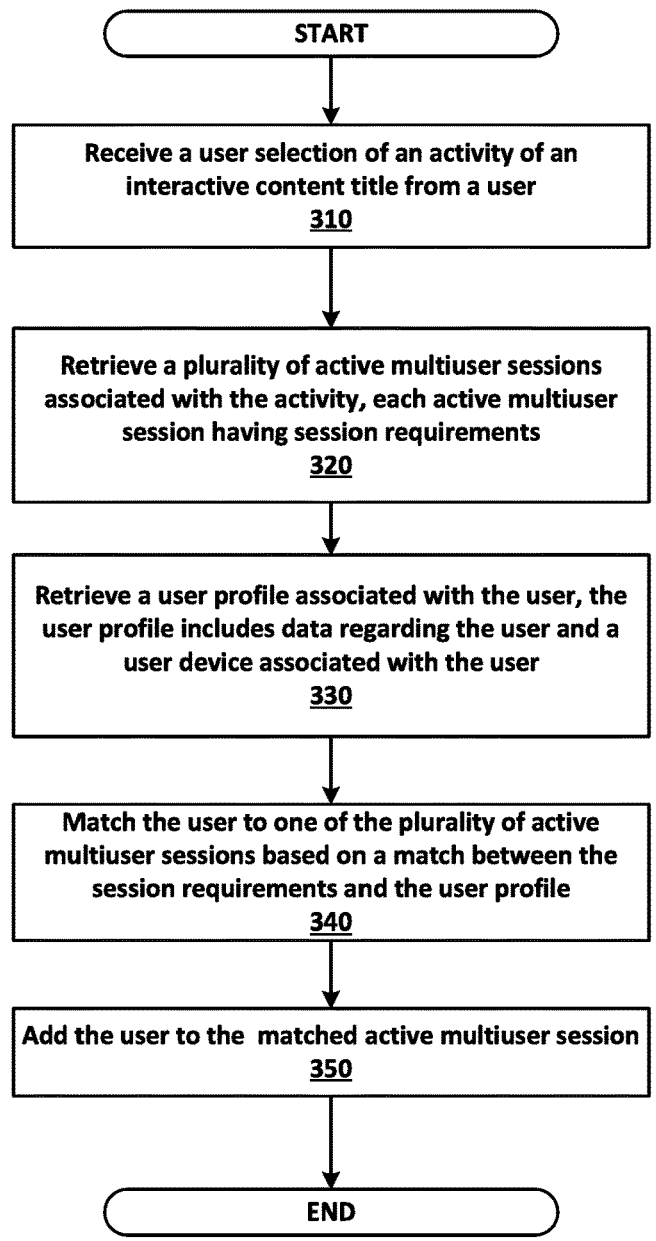
FIG. 3 is a flowchart illustrating an exemplary method for system-level multiuser matchmaking when a match with an existing multiuser session does occur.

FIG. 3 is a flowchart illustrating an exemplary method 300 for system-level multiuser matchmaking when a match for a user to an existing multiuser session occurs. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The execution of the instructions may be implemented on the cloud servers 160 (e.g., the steps identified in FIG. 3 are performed in the cloud). The steps identified in FIG. 3 (and the order thereof)

are exemplary and may include various alternatives, equivalents, or derivations thereof including but not limited to the order of execution of the same.

At step 310, a user selection of an activity associated with an interactive content title is received by the platform server 120. Such activity may be an activity requiring multiple user participation (e.g., a dungeon, multi-user quest, competitive match, etc.).

At step 320, a plurality of active multiuser sessions associated with the activity may be retrieved from the interactive content source servers 110 by the platform server 120. As described above, such active multiuser sessions may be in various states of progression (e.g., may need one or multiple more users). Such active multiuser sessions may also have session requirements restricting which users can join the active multiuser session. For example, a multiuser session (e.g., for a specific activity within a specific game title) may require that a character of the user has a minimum skill level. Such session requirements may also be based on one or more peer profiles of corresponding one or more peers already joined to the multiuser session. Such peer profile may include peer data regarding each peer (e.g., peer skills, character levels and/or skills, hours played, type of games played, etc.), an associated peer device (e.g., hardware components and capabilities, software, router information, geolocation etc.), and/or peer device peripherals (e.g., microphone, camera, mouse, controller, devices, etc.).

At step 330, a user profile associated with the user may be retrieved from memory stored on the platform server 120 or the user device 140 by the platform server 120. Such user profile may include user data regarding the user (e.g., peer skills, character levels and/or skills, hours played, type of games played, etc.), an associated user device (e.g., hardware components and capabilities, software, router information, geolocation etc.), and/or user device peripherals (e.g., microphone, camera, mouse, controller, devices, etc.).

At step 340, the user may be matched to one of the multiuser sessions by the platform server 120; and at step 350, the user device may be added to the matched multiuser session by the platform server 120. Such match may be based on a match between the session requirements and user data, user device data, and/or user device peripheral data from the user profile. For example, the session requirement may require that the user has previously participated in the selected activity, and the user data may indicate that the user has participated in the selected activity multiple times. Such session requirement may indicate that users with experience in the selected activity is required or desired to join the multiuser session.

After the selected activity is completed, the multiuser session may remain intact outside of the selected activity. A user or a peer of the multiuser session may then select another activity to participate in together. For example, the user and the peer may be part of the same system-level voice chat group (or other defined group). Such selected activity may or may not require further matchmaking between the multiuser session and the selected activity. Such multiuser session allows the user and peers to remain together when leaving and entering activities. As such, the user and peers do not need to engage in individual matchmaking for each different activity. In other words, a user can participate in multiple different activities with the same multiuser session and peers, thereby eliminating the conventional step of individual matchmaking by each user and each peer for each new activity.

Performing multiuser matchmaking at the platform server 120 may further simplify the steps to participate in an activity requiring multiple user participation by eliminating the step of launching the interactive title before matchmaking. Stated differently, the user simply selects a multiuser activity template from a user interface on the platform server 120, which initiates matchmaking. After matchmaking is completed, the multiuser activity launches, and the user can begin immediate interaction with the multiuser activity, thereby bypassing the conventional steps of launching the interactive content title, selecting a multiuser activity, and waiting for matchmaking to occur within the interactive content title.

Figure 4:
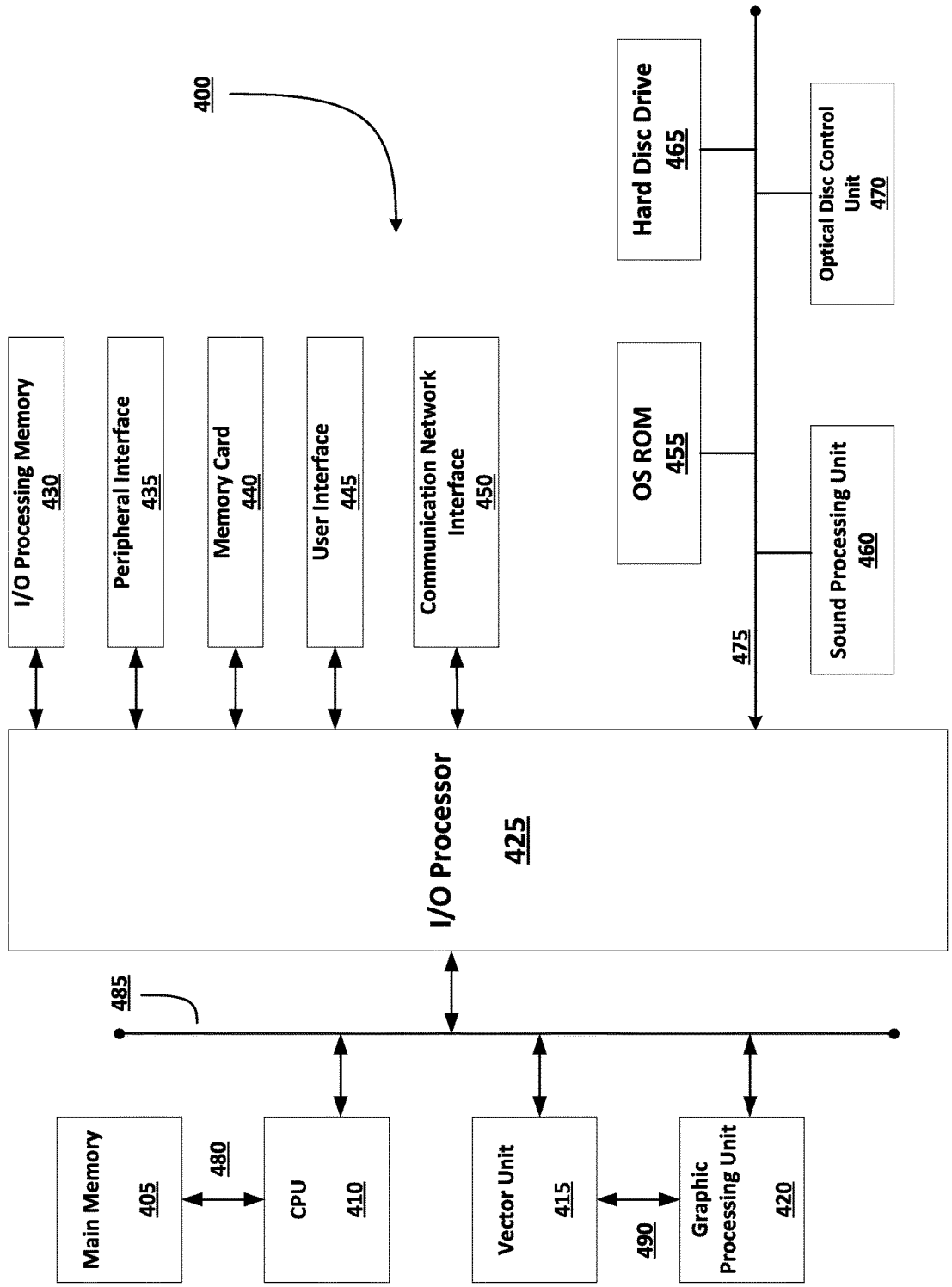
FIG. 4 is an exemplary electronic entertainment system that may be used in providing system-level multiuser matchmaking.

FIG. 4 is an exemplary user electronic entertainment system that may be used in launching interactive content and providing dynamic interfaces. The entertainment system 400 of FIG. 4 includes a main memory 405, a central processing unit (CPU) 410, vector unit 415, a graphics processing unit 420, an input/output (I/O) processor 425, an I/O processor memory 430, a peripheral interface 435, a memory card 440, a Universal Serial Bus (USB) interface 445, and a communication network interface 450. The entertainment system 400 further includes an operating system read-only memory (OS ROM) 455, a sound processing unit 460, an optical disc control unit 470, and a hard disc drive 465, which are connected via a bus 475 to the I/O processor 425.

Entertainment system 400 may be an electronic game console. Alternatively, the entertainment system 400 may be implemented as a general-purpose computer, a set-top box, a hand-held game device, a tablet computing device, a virtual reality device, an augmented reality device, or a mobile computing device or phone. Entertainment systems may contain more or less operating components depending on a particular form factor, purpose, or design.

The CPU 410, the vector unit 415, the graphics processing unit 420, and the I/O processor 425 of FIG. 4 communicate via a system bus 485. Further, the CPU 410 of FIG. 4 communicates with the main memory 405 via a dedicated bus 480, while the vector unit 415 and the graphics processing unit 420 may communicate through a dedicated bus 490. The CPU 410 of FIG. 4 executes programs stored in the OS ROM 455 and the main memory 405. The main memory 405 of FIG. 4 may contain pre-stored programs and programs transferred through the I/O Processor 425 from a CD-ROM, DVD-ROM, or other optical disc (not shown) using the optical disc control unit 470. I/O Processor 425 of FIG. 4 may also allow for the introduction of content transferred over a wireless or other communications network (e.g., 4G, LTE, 1G, and so forth). The I/O processor 425 of FIG. 4 primarily controls data exchanges between the various devices of the entertainment system 400 including the CPU 410, the vector unit 415, the graphics processing unit 420, and the peripheral interface 435.

The graphics processing unit 420 of FIG. 4 executes graphics instructions received from the CPU 410 and the vector unit 415 to produce images for display on a display device (not shown). For example, the vector unit 415 of FIG. 4 may transform objects from three-dimensional coordinates to two-dimensional coordinates, and send the two-dimensional coordinates to the graphics processing unit 420. Furthermore, the sound processing unit 460 executes instructions to produce sound signals that are outputted to an audio device such as speakers (not shown). Other devices may be connected to the entertainment system 400 via the USB interface 445, and the communication network interface 450 such as wireless transceivers, which may also be embedded in the system 400 or as a part of some other component such as a processor.

A user of the entertainment system 400 of FIG. 4 provides instructions via the peripheral interface 435 to the CPU 410, which allows for use of a variety of different available peripheral devices (e.g., controllers) known in the art. For example, the user may instruct the CPU 410 to store certain game information on the memory card 440 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing system-level multiuser matchmaking, the method comprising:
  receiving a user selection from a user device of a user, wherein the user selection specifies a selected multiuser activity associated with an interactive content title, wherein the user device is external to currently active multiuser sessions associated with the selected multiuser activity;
  retrieving an activity template associated with the selected multiuser activity, the activity template providing activity requirements required to launch the selected multiuser activity;
  establishing a new multiuser session having session requirements that are based on at least the activity requirements provided by the activity template;
  adding the user device and at least one identified peer device to the new multiuser session, wherein the at least one identified peer device is associated with at least one peer identified based on the session requirements; and
  launching the interactive content title at a starting point of the selected multiuser activity in the new multiuser session that has been established for the user device and the at least one identified peer device.

2. The method of claim 1, further comprising attempting to match the user to one of currently active multiuser sessions, wherein a no-match is yielded when the user does not match any of the currently active multiuser sessions.

3. The method of claim 1, further comprising retrieving a user profile associated with the user, the user profile providing data regarding the user, the user device, and one or more associated peripheral devices, and wherein adding the user device to the new multiuser session is based on the user profile.

4. The method of claim 3, further comprising retrieving a peer profile associated with the at least one peer, the peer profile providing data regarding the at least one peer and the at least one identified peer device, wherein adding the at least one identified peer device to the new multiuser session includes comparing the peer profile to the session requirements.

5. The method of claim 1, wherein the session requirements further include a required skill level to participate in the selected multiuser activity.

6. The method of claim 5, wherein the required skill level is based on a skill level of the user.

7. The method of claim 1, wherein the selected multiuser activity is a competitive match, and wherein the at least one idenfitied peer device is associated with an existing multiuser session.

8. The method of claim 7, further comprising matching the new multiuser session to the existing multiuser session of the at least one identified peer device, and wherein launching the selected multiuser activity further includes joining the existing multiuser session to the new multiuser session.

9. The method of claim 1, wherein the new multiuser session includes voice-chat.

10. The method of claim 1, further comprising retrieving information regarding at least one active multiuser session associated with the selected multiuser activity, wherein establishing the new multiuser session is based on a comparison of the retrieved information to the activity requirements of the activity template.

11. The method of claim 1, wherein the session requirements includes at least one of hardware and software requirements.

12. The method of claim 1, wherein the activity template includes a structured data set for tracking and displaying information regarding a corresponding activity in real-time.

13. A method for providing system-level multiuser matchmaking, the method comprising:
  receiving a user selection of a selected multiuser activity of an interactive content title from a user device of a user, wherein the user device is external to currently active multiuser sessions associated with the multiuser activity, each active multiuser session having session requirements;

retrieving a user profile associated with the user, the user profile including data regarding the user, the user device, and one or more peripherals of the user device;

matching the user device to an identified active multiuser session of the currently active multiuser sessions based on a match between the session requirements of the identified active multiuser session and the user profile; and adding the user device to the identified active multiuser session.

14. The method of claim 13, further comprising launching the interactive content title at a starting point of the selected multiuser activity within the identified active multiuser session.

15. The method of claim 13, wherein the selected multiuser activity is a competitive match, wherein the identified active multiuser session includes at least one peer device of at least one peer.

16. The method of claim 15, further comprising launching the competitive match between the user and the at least one peer within the identified active multiuser session.

17. The method of claim 13, wherein the session requirements are based on a peer profile associated with at least one peer device of at least one peer associated with the identified active multiuser session, the peer profile providing data regarding the at least one peer and the at least one peer device.

18. The method of claim 17, wherein the session requirements are further based on activity requirements required to launch the selected multiuser activity.

19. The method of claim 18, wherein the activity requirements includes requiring a same type of device for each user and each peer within the identified active multiuser session.

20. The method of claim 18, wherein the session requirements further include a required skill level to participate in the selected multisuser activity.

21. The method of claim 20, wherein the required skill level is based on a skill level of the at least one peer.

22. The method of claim 13, wherein the interactive content title is a video game.

23. A system for system-level multiuser matchmaking, the system comprising:

memory that stores interactive content titles and one or more activity templates associated with each interactive content title;

a network interface that establishes a session with a user device associated with a user over a communication network; and one or more processors that executes instructions stored in memory, wherein execution of the instructions by the one or more processors:

receives a user selection from the user device wherein the user selection specifies a selected multiuser activity associated with an interactive content title, wherein the user device is external to currently active multiuser sessions associated with the selected multiuser activity;

retrieves an activity template stored in the memory associated with the selected multiuser activity, the activity template providing activity requirements required to launch the selected multiuser activity;

establishes a new multiuser session having session requirements that are based on at least the activity requirements provided by the activity template;

adds the user device and at least one identified peer device to the new multiuser session, wherein the at least one identified peer device is associated with at least one peer identified based on the session requirements; and launches the interactive content title at a starting point of the selected multiuser activity in the new multiuser session that has been established for the user device and the at least one identified peer device.

24. A non-transitory computer-readable medium having embodied thereon a program executable by a processor to perform a method for providing system-level multiuser matchmaking, the method comprising:

receiving a user selection from a user device of a user, wherein the user selection specifies a selected multiuser activity associated with an interactive content title, wherein the user device is external to currently active multiuser sessions associated with the selected multiuser activity;

retrieving an activity template associated with the selected multiuser activity, the activity template providing activity requirements required to launch the selected multiuser activity;

establishing a new multiuser session having session requirements that are based on at least the activity requirements provided by the activity template;

adding the user device and at least one identified peer device to the new multiuser session, wherein the at least one identified peer device is associated with at least one peer identified based on the session requirements; and launching the interactive content title at a starting point of the selected multiuser activity in the new multiuser session that has been established for the user device and the at least one identified peer device.

* * * * *